(12) United States Patent
Takeo

(10) Patent No.: US 7,324,676 B2
(45) Date of Patent: Jan. 29, 2008

(54) ABNORMAL SHADOW DETECTING METHOD, ABNORMAL SHADOW DETECTING SYSTEM AND ABNORMAL SHADOW DETECTING PROGRAM

(75) Inventor: Hideya Takeo, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 715 days.

(21) Appl. No.: 10/779,841

(22) Filed: Feb. 18, 2004

(65) Prior Publication Data

US 2004/0161142 A1    Aug. 19, 2004

(30) Foreign Application Priority Data

Feb. 19, 2003    (JP)    ............................. 2003/041341

(51) Int. Cl.
*G06K 9/00* (2006.01)
(52) U.S. Cl. .................... 382/128; 382/274; 378/37
(58) Field of Classification Search ................. 382/128, 382/129, 130, 131, 132, 168, 172, 203, 232, 382/260, 274, 275, 276, 305, 308; 378/62, 378/4, 37, 19, 20, 39
See application file for complete search history.

(56) References Cited

U.S. PATENT DOCUMENTS

| 5,732,121 | A | * | 3/1998 | Takeo et al. ................... 378/62 |
| 5,761,334 | A | * | 6/1998 | Nakajima et al. ............ 382/132 |
| 5,768,333 | A | * | 6/1998 | Abdel-Mottaleb ............ 378/37 |
| 6,272,233 | B1 | * | 8/2001 | Takeo .......................... 382/128 |
| 6,748,044 | B2 | * | 6/2004 | Sabol et al. .................... 378/4 |
| 7,187,789 | B2 | * | 3/2007 | Takeo .......................... 382/128 |

FOREIGN PATENT DOCUMENTS

JP    2002-109510 A    4/2002

* cited by examiner

*Primary Examiner*—Seyed Azarian
(74) *Attorney, Agent, or Firm*—Sughrue Mion, PLLC

(57) ABSTRACT

Primary prospective abnormal shadow regions in images of objects are detected by different kinds of detecting processes. Whether or not the respective primary prospective abnormal shadow regions are of a desired abnormal shadow is determined by methods different from each other according to the kinds of processes by which the respective primary prospective abnormal shadow regions are detected. Only primary prospective abnormal shadow regions which are determined to be of a desired abnormal shadow are output as final prospective abnormal shadow regions.

12 Claims, 1 Drawing Sheet

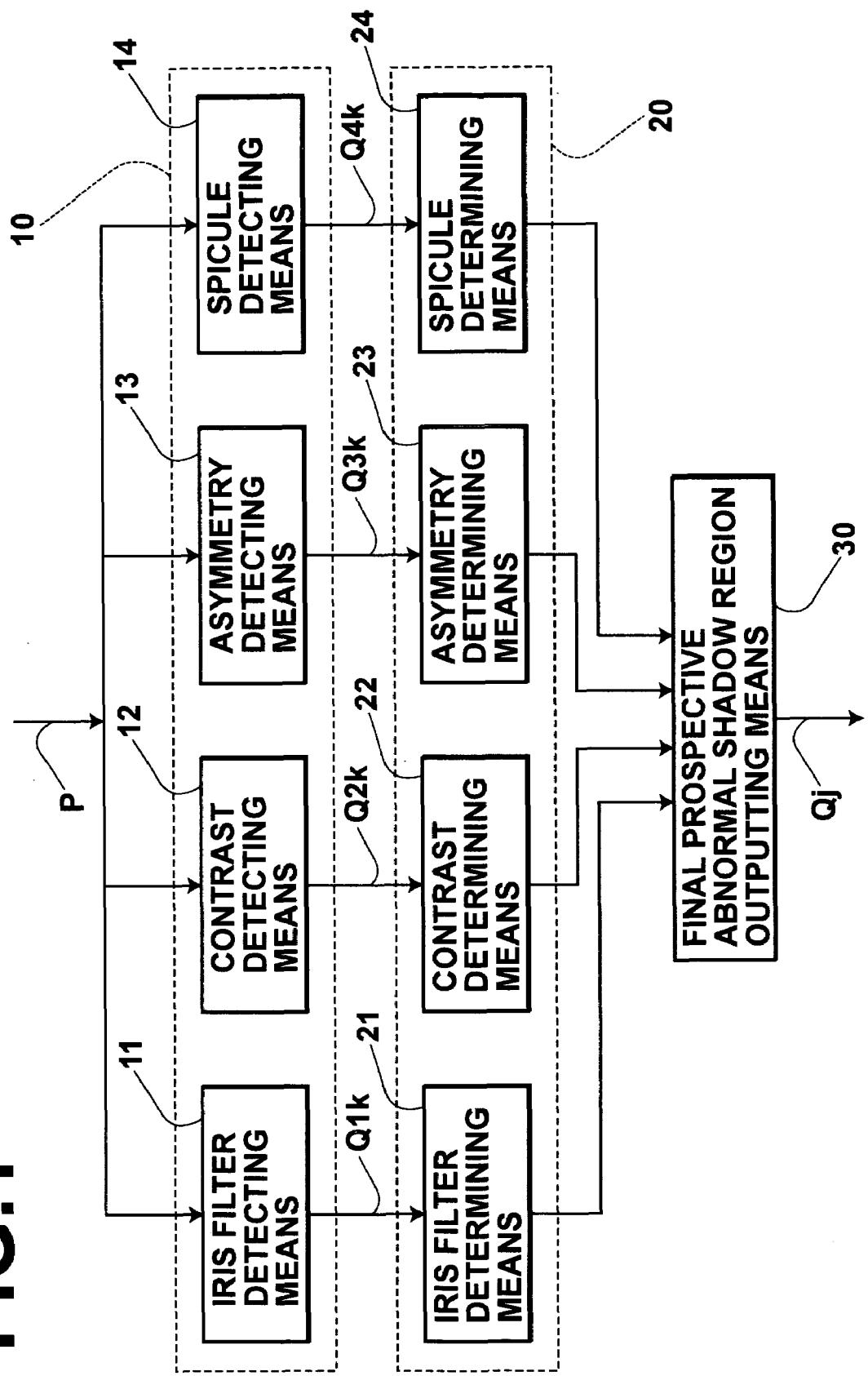

ABNORMAL SHADOW DETECTING METHOD, ABNORMAL SHADOW DETECTING SYSTEM AND ABNORMAL SHADOW DETECTING PROGRAM

BACKGROUND OF THE INVENTION

1. Field of the Invention

This invention relates to a method of and a system and a program for detecting an abnormal shadow in a radiation image, and more particularly to an improvement in detecting a prospective abnormal shadow.

2. Description of the Related Art

In the medical field, to find a diseased part of a patient or to observe a diseased part of a patient and diagnose progress of disease by reading a radiation image of the object (patient) has been a common operation. However, radiation image reading often depends upon experience and abilities of the reader and is not necessarily objective.

For example, it is necessary to find an abnormal shadow representing a growth and/or a micro calcification representative of a cancerous part in a mammogram (a radiation image of a breast) taken for the purpose of a breast cancer examination. However, depending on the reader, the abnormal shadow range cannot be properly detected. Accordingly, there has been a demand to properly detect an abnormal shadow including shadows of a growth and a micro calcification irrespective of the abilities of the reader.

In order to meet this demand, there have been proposed abnormal shadow detecting systems, for instance, in U.S. Pat. No. 5,761,334 in which a prospective abnormal shadow region in an image of an object is automatically detected by the use of a computer on the basis of image data representing the image.

In the abnormal shadow detecting system, a prospective abnormal shadow region is automatically detected by the use of an iris filter processing which is mainly suitable for detecting a growth shadow and/or a morphology filter which is mainly suitable for detecting a micro calcification shadow.

In order to improve prospective region detecting accuracy, there has been proposed, for instance, in Japanese Unexamined Patent Publication No. 2002-109510, a method of detecting a prospective abnormal shadow region in two stages where a characteristic value on the image is calculated for the prospective abnormal shadow regions detected by the technology described above and whether or not the prospective abnormal shadow region is of a malignant one is determined on the basis of the calculated characteristic value.

Recently, there have been proposed various methods of detecting a prospective abnormal shadow region in addition to the methods using the iris filter and a morphology filter. However, whether or not the prospective abnormal shadow region is of a malignant one is determined by the same method irrespective of the method of detecting a prospective abnormal shadow region.

Since the prospective abnormal shadow region has a characteristic which differs by the kind of detection used for detecting the prospective abnormal shadow region, the method where whether or not the prospective abnormal shadow region is of a malignant one is determined by the same method irrespective of the method of detecting a prospective abnormal shadow region cannot fully utilize the characteristic of the prospective abnormal shadow region, which can result in deterioration in abnormal shadow detecting performance.

SUMMARY OF THE INVENTION

In view of the foregoing observations and description, the primary object of the present invention is to provide a method of and a system and a program for detecting an abnormal shadow in a radiation image in which the performance of detecting a prospective abnormal shadow can be improved.

In accordance with a first aspect of the present invention, there is provided an abnormal shadow detecting method comprising the steps of detecting primary prospective abnormal shadow regions in images of objects by different kinds of detecting processes, determining whether or not the respective primary prospective abnormal shadow regions are of a desired abnormal shadow by methods different from each other according to the kinds of processes by which the respective primary prospective abnormal shadow regions are detected, and outputting as final prospective abnormal shadow regions only primary prospective abnormal shadow regions which are determined to be of a desired abnormal shadow.

In accordance with a second aspect of the present invention, there is provided an abnormal shadow detecting system comprising a primary prospective region detecting means which detects primary prospective abnormal shadow regions in images of objects on the basis of image data representing the images of the objects by different kinds of detecting processes, a determining means which determines whether or not the respective primary prospective abnormal shadow regions are of a desired abnormal shadow by methods different from each other according to the kinds of processes by which the respective primary prospective abnormal shadow regions are detected, and a final prospective abnormal shadow region outputting means which outputs as final prospective abnormal shadow regions only primary prospective abnormal shadow regions which are determined to be of a desired abnormal shadow.

The detecting processes may include, for instance, a process mainly for detecting a growth shadow region in which convergence of density gradients in the image of the object is calculated by the use of an iris filter and a prospective growth shadow region is detected by extracting a region where the convergence of density gradients is high, a process mainly for detecting a prospective category 3 growth shadow region by extracting a region where the contrast is high and the boundary is clear, a process mainly for detecting a prospective asymmetric shadow region in which left and right mammary gland distributions are compared with each other and a prospective asymmetric shadow region is detected by extracting regions where left and right mammary gland distributions are not symmetric, and a process mainly for detecting a prospective spicule region in which convergence of lines in the lineation is calculated and a prospective spicule region is detected by extracting a region where the convergence of lines is high. The "category 3 growth shadow" is a shadow of an abnormal tissue which is generally benignant but possibility of being malignant of which cannot be denied, and the "spicule" is a shadow of a linear abnormal tissue which appears along a mammary gland of a breast.

The "desired abnormal shadow" may be, for instance, "a malignant abnormal shadow", or "a benignant abnormal shadow" or "a malignant abnormal shadow and a benignant abnormal shadow". That is, when only a malignant abnormal shadow is to be detected, the "desired abnormal shadow" is "a malignant abnormal shadow" and when only a benignant abnormal shadow is to be detected, the "desired abnormal shadow" is "a benignant abnormal shadow". Further, when a malignant abnormal shadow and a benignant abnormal shadow are to be detected together, the "desired abnormal shadow" is "a malignant abnormal shadow and a benignant abnormal shadow".

Whether or not the respective primary prospective abnormal shadow regions are of a desired abnormal shadow may be determined on the basis of a combination of a plurality of characteristic values for the respective primary prospective abnormal shadow regions predetermined by the kinds of processes by which the respective primary prospective abnormal shadow regions are detected. In this case, whether or not the respective primary prospective abnormal shadow regions are of a desired abnormal shadow may be determined on the basis of Mahalanobis distances in the plurality of characteristic values.

The "characteristic values for the prospective abnormal shadow region" are those representing features of the prospective abnormal shadow region and at the same time representing malignancy or benignancy of the prospective abnormal shadow region and include, for instance, dispersion, contrast, and an angular moment representing features of a density histogram for the prospective abnormal shadow region, dispersion, deviation, correlation, moment and entropy representing features of surrounding parts of the prospective abnormal shadow region, and circularity representing features in shape of the prospective abnormal shadow region.

The "Mahalanobis distance" is an index of distance used for recognition of an image pattern and the value of the Mahalanobis distance represents similarity in image pattern of one image to another image. A plurality of characteristic values representing features of an image pattern are expressed in vectors, and the "Mahalanobis distance" is defined to reflect difference in vector between a reference image and an image to be recognized.

Further it is possible to determine whether or not the respective primary prospective abnormal shadow regions are of a desired abnormal shadow by the likelihood ratio based on a Mahalanobis distance. The likelihood ratio based on a Mahalanobis distance is defined by a ratio Dm1/Dm2 of a Mahalanobis distance Dm1 from a pattern class representing a non-malignant shadow which has been empirically obtained to a Mahalanobis distance Dm2 from a pattern class representing a malignant shadow which has been empirically obtained. It may be judged that the larger the likelihood ratio is, the possibility that the region is of a malignant shadow is stronger, and the smaller the likelihood ratio is, the possibility that the region is of a non-malignant shadow is stronger. Accordingly, for instance, it maybe determined that the region is of a malignant shadow, when the likelihood ratio is not smaller than a threshold value and that the region is of a non-malignant shadow, when the likelihood ratio is smaller than the threshold value.

In accordance with a third aspect of the present invention, there is provided a computer program for causing a computer to execute an abnormal shadow detecting process comprising the steps of detecting primary prospective abnormal shadow regions in images of objects by different kinds of detecting processes, determining whether or not the respective primary prospective abnormal shadow regions are of a desired abnormal shadow by methods different from each other according to the kinds of processes by which the respective primary prospective abnormal shadow regions are detected, and outputting as final prospective abnormal shadow regions only primary prospective abnormal shadow regions which are determined to be of a desired abnormal shadow.

In the present invention, a breast is especially suitable as the object.

In accordance with the present invention, since the determination process (for determining whether or not the primary prospective abnormal shadow region is of a desired abnormal shadow) is carried out by a method according to the kind of the detection process (by which the primary prospective abnormal shadow region is detected), the determination process can fully utilize the characteristic of the prospective abnormal shadow region reflecting the feature of the detection process employed, whereby the accuracy in determination can be improved and the abnormal shadow detecting performance can be improved.

When the determination process is carried out on the basis of a combination of a plurality of characteristic values for the respective primary prospective abnormal shadow regions predetermined by the kinds of the detection process, change in detection process can be dealt with by simply changing the combination of the characteristic values, whereby the determination process can be relatively easily arranged and improvement of the accuracy in determination can be flexibly attempted.

When the determination process is carried out on the basis of Mahalanobis distances in the plurality of characteristic values, the determination process can be carried out on the basis of similarity of the prospective abnormal shadow region to an empirically obtained malignant abnormal shadow or an empirically obtained benignant abnormal shadow, surer determination can be performed.

Since the determination process for narrowing down prospective abnormal shadow regions detected by the detection process has borne fruit especially in detection of breast cancer, whether or not the primary prospective abnormal shadow region is of a desired abnormal shadow can be more surely determined when the object is a breast.

BRIEF DESCRIPTION OF THE DRAWINGS

FIG. 1 is a view schematically showing an abnormal shadow detecting system in accordance with an embodiment of the present invention.

DESCRIPTION OF THE PREFERRED EMBODIMENT

In FIG. 1, an abnormal shadow detecting system 1 in accordance with an embodiment of the present invention comprises a primary prospective region detecting means 10 which detects primary prospective abnormal shadow regions in images of objects on the basis of image data P representing the images of the objects by different kinds of detecting processes, a determining means 20 which determines whether or not the respective primary prospective abnormal shadow regions are of a desired abnormal shadow by methods different from each other according to the kinds of processes by which the respective primary prospective abnormal shadow regions are detected, and a final prospective abnormal shadow region outputting means 30 which outputs as final prospective abnormal shadow regions Qj only primary prospective abnormal shadow regions which are determined to be of a desired abnormal shadow.

The primary prospective region detecting means 10 comprises an iris filter detecting means 11 mainly for detecting a primary prospective growth shadow region, a contrast detecting means 12 mainly for detecting a primary prospective category 3 growth shadow region, an asymmetry detecting means 13 mainly for detecting a primary prospective asymmetric shadow region, and a spicule detecting means 14 mainly for detecting a primary prospective spicule region.

The determining means 20 comprises an iris filter determining means 21 which determines whether or not the primary prospective abnormal shadow regions Q1$i$ detected by the iris filter detecting means 11 are of a desired abnormal shadow, a contrast determining means 22 which determines whether or not the primary prospective abnormal shadow regions Q2$i$ detected by the contrast detecting means 12 are of a desired abnormal shadow, an asymmetry determining means 23 which determines whether or not the primary prospective abnormal shadow regions Q3$i$ detected by the asymmetry detecting means 13 are of a desired abnormal shadow, and a spicule determining means 24 which determines whether or not the primary prospective abnormal shadow regions Q4$i$ detected by the spicule detecting means 14 are of a desired abnormal shadow.

Operation of the abnormal shadow detecting system of this embodiment will be described hereinbelow. In this particular embodiment, the object image is a radiation image of a breast, and the desired abnormal shadow is a malignant abnormal shadow.

When image data P representing a radiation image of a breast is input into the abnormal shadow detecting system 1, the iris filter detecting means 11 calculates convergence of density gradients in the radiation image P by the use of an iris filter on the basis of the image data P and detects four (at most) regions which are higher than any other regions in the convergence of density gradients as the primary prospective abnormal shadow regions Q1$k$. Then the iris filter determining means 21 calculates a combination G1 of a plurality of characteristic values in the respective primary prospective abnormal shadow regions Q1$k$. The combination G1 is of a plurality of characteristic values which are suitable for determining whether or not the primary prospective abnormal shadow region Q1$k$ is of a desired abnormal shadow. Further, the iris filter determining means 21 determines whether or not the primary prospective abnormal shadow region Q1$k$ is of a malignant abnormal shadow by the use of Mahalanobis distances of the characteristic values in the combination G1 calculated.

First, the Mahalanobis distance Dm1 of the primary prospective region from a pattern class (i=1) representing a non-malignant shadow which has been empirically determined and the Mahalanobis distance Dm2 of the primary prospective region from a pattern class (i=2) representing a malignant shadow which has been empirically determined are calculated according to the following formula (1).

$$Dmi = (\vec{x} - \vec{m_i})^t \sum_i^{-1} (\vec{x} - \vec{m_i}) \quad (1)$$

wherein $$\sum_i$$

represents a covariance matrix of a pattern class (a non-malignant pattern, when i=1, a malignant pattern when i=2) wi, that is, $$\sum_i = (1/Ni) \sum_{x \in wi} (\vec{x} - \vec{m_i})(\vec{x} - \vec{m_{i15}})^t$$

wherein t represents a transposed vector (a transverse vector), $$\vec{x}$$

represents a characteristic value x in vector (that is, $$\vec{x} = (x1, x2, \ldots, xN), \sum_i^{-1}$$

represents an inverse matrix of $$\sum_i, \text{and } \vec{m_i}$$

represents the average of the pattern class wi $$\left(\text{that is, } \vec{m_i} = (1/Ni) \sum_{x \in wi} \vec{x}\right).$$

The characteristic values in the combination G1 respectively correspond to x1 to xN and express an N-dimensional space (x1, x2, . . . , xN). The Mahalanobis distance between the pattern of the primary prospective region as expressed on the N-dimensional pattern space and the pattern of a non-malignant shadow as expressed on the N-dimensional pattern space is Dm1, the Mahalanobis distance between the pattern of the primary prospective region as expressed on the N-dimensional pattern space and the pattern of a malignant shadow as expressed on the N-dimensional pattern space is Dm2.

The non-malignant shadow pattern and the malignant shadow pattern are pattern spaces defined by vectors x which have been set respectively for non-malignant shadows and malignant shadows on the basis of the result of investigation on a lot of prospective abnormal shadows. For example, the pattern class w1 of non-malignant shadows is defined by the average of the vectors x of non-malignant shadows, and the pattern class w2 of malignant shadows is defined by the average of the vectors x of malignant shadows.

For example, when the prospective region is of a malignant shadow, there is a tendency for the Mahalanobis distance from the pattern class of the malignant shadow to be short (Dm2 is small) and for the Mahalanobis distance from the pattern class of the non-malignant shadow to fluctuate. To the contrast, when the prospective region is of a non-malignant shadow, there is a tendency for the Mahalanobis distance from the pattern class of the non-malignant shadow to be short (Dm1 is small) and for the Mahalanobis distance from the pattern class of the malignant shadow to fluctuate. A likelihood ratio (Dm1/Dm2) for distinguishing the malignant shadow from the non-malignant shadow according to these tendencies is calculated for each of the prospective regions.

The likelihood ratio is defined by Dm1/Dm2 and as the likelihood ratio is larger, the probability that the prospective region is of a malignant shadow is stronger and as the likelihood ratio is smaller, the probability that the prospective region is a non-malignant shadow is stronger. For instance, it is determined that the prospective region is of a malignant shadow when the likelihood ratio is not smaller than a predetermined threshold value Th, and that the prospective region is of a non-malignant shadow when the likelihood ratio is smaller than the threshold value Th.

Then the contrast detecting means 12 calculates on the basis of the image data P an index representing contrast to the surrounding and clearness of the boundary and detects two (at most) regions which are higher than any other regions in the index as the primary prospective abnormal shadow regions (of a category 3 growth shadow) Q2$k$. Then the contrast determining means 22 calculates a combination G2 of a plurality of characteristic values in the respective primary prospective abnormal shadow regions Q2$k$. The combination G2 is of a plurality of characteristic values which are suitable for determining whether or not the primary prospective abnormal shadow region Q2$k$ is of a desired abnormal shadow. Further, the contrast determining means 22 calculates a likelihood ratio of Mahalanobis distances from the combination G2 of a plurality of characteristic values calculated and determines that the primary prospective abnormal shadow region Q2$k$ is of a malignant abnormal shadow when the likelihood ratio is not smaller than a predetermined threshold value.

Similarly, the asymmetry detecting means 13 calculates on the basis of the image data P the degree of asymmetry and detects one (at most) region which is higher than any other regions in the degree of asymmetry as the primary prospective abnormal shadow regions (of an asymmetric shadow) Q3$k$. Then the asymmetry determining means 23 calculates a combination G3 of a plurality of characteristic values in the respective primary prospective abnormal shadow regions Q3$k$. Further, the asymmetry determining means 23 calculates a likelihood ratio of Mahalanobis distances from the combination G3 of a plurality of characteristic values calculated and determines that the primary prospective abnormal shadow region Q3$k$ is of a malignant abnormal shadow when the likelihood ratio is not smaller than a predetermined threshold value.

Similarly, the spicule detecting means 14 calculates the convergence of lines in the lineation and detects two (at most) region which is higher than any other regions in the convergence of lines in the lineation as the primary prospective abnormal shadow regions (mainly of a spicule shadow) Q4$k$. Then the spicule determining means 24 calculates a combination G4 of a plurality of characteristic values in the respective primary prospective abnormal shadow regions Q4$k$. Further, the spicule determining means 24 calculates a likelihood ratio of Mahalanobis distances from the combination G4 of a plurality of characteristic values calculated and determines that the primary prospective abnormal shadow region Q4$k$ is of a malignant abnormal shadow when the likelihood ratio is not smaller than a predetermined threshold value.

The combinations G1 to G4 may be, for instance, as shown in the following table 1. That is, the combination G1 to be calculated for the primary prospective abnormal shadow regions Q1$k$ detected by the iris filter detecting means 11 may include a quadric statistic "Correlation", a quadric statistic "Difference Entropy", skewness in the circle, entropy in the circle, kurtosis in the ring and the like, the combination G2 to be calculated for the primary prospective abnormal shadow regions Q2$k$ detected by the contrast detecting means 12 may include a quadric statistic "Correlation", a quadric statistic "Inverse Difference Moment", a quadric statistic "Difference Entropy", a quadric statistic "Sum Entropy", secondary moment in the circle and the like, the combination G3 to be calculated for the primary prospective abnormal shadow regions Q3$k$ detected by the asymmetry detecting means 13 may include a quadric statistic "Inverse Difference Moment", skewness in the circle, entropy in the circle, kurtosis in the ring, entropy in the ring and the like, and the combination G4 to be calculated for the primary prospective abnormal shadow regions Q4$k$ detected by the spicule detecting means 14 may include secondary moment in the circle, secondary moment in the ring, entropy in the ring, a quadric statistic "Difference Variance", a quadric statistic "Information Measure of Correlation 1" and the like.

| Characteristic value | Combination of characteristic values | | | |
|---|---|---|---|---|
| | G1 | G2 | G3 | G4 |
| Quadric statistic: Correlation | ○ | ○ | | |
| Quadric statistic: Sum of Squares: Variance | | | | |
| Quadric statistic: Inverse Difference Moment | | ○ | ○ | |
| Quadric statistic: Difference Entropy | ○ | ○ | | |
| Quadric statistic: Sum Entropy | | ○ | | |
| Spreadness | | | | |
| Variance in the Circle | | | | |
| Secondary Moment in the Circle | | ○ | | ○ |
| Energy in the Circle | | | | |
| area | | | | |
| Variance in the Ring | | | | |
| Energy in the Ring | | | | |
| Secondary Moment in the Ring | | | ○ | ○ |
| Skewness in the Circle | ○ | | ○ | |
| Kurtosis in the Circle | ○ | | | |
| Average in the Circle | | | | |
| Entropy in the Circle | ○ | ○ | ○ | |
| Skewness in the Ring | | | ○ | |
| Kurtosis in the Ring | ○ | | ○ | |
| Average in the Ring | | | | |
| Entropy in the Ring | ○ | ○ | ○ | ○ |
| Quadric Statistic: Angular Second moment | ○ | | | |
| Quadric Statistic: Contrast | | | | |
| Quadric Statistic: Sum Average | ○ | | | |
| Quadric Statistic: Sum Variance | ○ | | | |
| Quadric Statistic: Entropy | | ○ | | |
| Quadric Statistic: Difference Variance | | | ○ | ○ |
| Quadric Statistic: Information measure of Correlation 1 | | | ○ | ○ |
| Quadric Information measure of Correlation 2 | ○ | | | |
| Quadric Statistic: Maximal Correlation Coefficient | | | | |

The final prospective abnormal shadow region outputting means 30 outputs as final prospective abnormal shadow regions Q$j$ only primary prospective abnormal shadow regions which are determined to be of a desired abnormal shadow by the respective determining means. A plurality of prospective abnormal shadow regions which are close to each other in the center thereof or the center of gravity of brightness may be united to one prospective region so that one region is not repeatedly detected as the prospective abnormal shadow region.

In the abnormal shadow detecting system 1 of this embodiment, since the primary prospective region detecting means 10 detects primary prospective abnormal shadow regions in images of objects in different processes on the basis of image data P representing the objects, the determining means 20 determines whether or not the respective primary prospective abnormal shadow regions are of a desired abnormal shadow by methods different from each other according to the kinds of processes by which the respective primary prospective abnormal shadow regions are detected, and a final prospective abnormal shadow region outputting means 30 outputs as final prospective abnormal shadow regions only primary prospective abnormal shadow regions which are determined to be of a desired abnormal shadow, the determination process can fully utilize the characteristic of the prospective abnormal shadow region reflecting the feature of the detection process employed, whereby the accuracy in determination can be improved and the abnormal shadow detecting performance can be improved.

Though, in the embodiment described above, the characteristic values in each prospective abnormal shadow region are calculated, each time one detecting means detects prospective abnormal shadow regions, the characteristic values in each prospective abnormal shadow region may be calculated in other procedures without limited to the procedure described above in conjunction with the above embodiment. For example, the characteristic values in each prospective abnormal shadow region may be calculated after all the detecting means detects the primary prospective abnormal shadow regions.

Further, combinations of characteristic values are only an example and may be variously arranged.

What is claimed is:

1. An abnormal shadow detecting method comprising the steps of detecting primary prospective abnormal shadow regions in images of objects by different kinds of detecting processes, determining whether or not the respective primary prospective abnormal shadow regions are of a desired abnormal shadow by methods different from each other according to the kinds of processes by which the respective primary prospective abnormal shadow regions are detected, and outputting as final prospective abnormal shadow regions only primary prospective abnormal shadow regions which are determined to be of a desired abnormal shadow;

wherein whether or not the respective primary prospective abnormal shadow regions are of a desired abnormal shadow is determined on the basis of a combination of a plurality of characteristic values for the respective primary prospective abnormal shadow regions predetermined by the kinds of processes by which the respective primary prospective abnormal shadow regions are detected.

2. An abnormal shadow detecting method as defined in claim 1 in which whether or not the respective primary prospective abnormal shadow regions are of a desired abnormal shadow is determined on the basis of Mahalanobis distances in the plurality of characteristic values.

3. An abnormal shadow detecting method as defined in claim 1 in which the object is a breast.

4. An abnormal shadow detecting system comprising
    a primary prospective region detecting means which detects primary prospective abnormal shadow regions in images of objects on the basis of image data representing the images of the objects by different kinds of detecting processes,
    a determining means which determines whether or not the respective primary prospective abnormal shadow regions are of a desired abnormal shadow by methods different from each other according to the kinds of processes by which the respective primary prospective abnormal shadow regions are detected, and
    a final prospective abnormal shadow region outputting means which outputs as final prospective abnormal shadow regions only primary prospective abnormal shadow regions which are determined to be of a desired abnormal shadow;
    wherein whether or not the respective primary prospective abnormal shadow regions are of a desired abnormal shadow is determined on the basis of a combination of a plurality of characteristic values for the respective primary prospective abnormal shadow regions predetermined by the kinds of processes by which the respective primary prospective abnormal shadow regions are detected.

5. An abnormal shadow detecting system as defined in claim 4 in which whether or not the respective primary prospective abnormal shadow regions are of a desired abnormal shadow is determined on the basis of Mahalanobis distances in the plurality of characteristic values.

6. An abnormal shadow detecting system as defined in claim 4 in which the object is a breast.

7. A computer-readable medium storing for causing a computer to execute an abnormal shadow detecting process comprising the steps of
    detecting primary prospective abnormal shadow regions in images of objects by different kinds of detecting processes,
    determining whether or not the respective primary prospective abnormal shadow regions are of a desired abnormal shadow by methods different from each other according to the kinds of processes by which the respective primary prospective abnormal shadow regions are detected, and
    outputting as final prospective abnormal shadow regions only primary prospective abnormal shadow regions which are determined to be of a desired abnormal shadow,
    wherein whether or not the respective primary prospective abnormal shadow regions are of a desired abnormal shadow is determined on the basis of a combination of a plurality of characteristic values for the respective primary prospective abnormal shadow regions predetermined by the kinds of processes by which the respective primary prospective abnormal shadow regions are detected.

8. The abnormal shadow detecting method as defined in claim 1, wherein the different kinds of detecting processes are at least two detecting processes.

9. The abnormal shadow detecting method as defined in claim 8, wherein the at least two detecting processes comprise either two of an iris filter process, a contrast detecting process, an asymmetry detecting process, and a spicule detecting process.

10. The abnormal shadow detecting method as defined in claim 1, wherein the different kinds of detecting processes comprise a process for detecting a growth shadow region, a process for detecting a prospective category three growth shadow region, a process for detecting a prospective asymmetric shadow region, and a process for detecting a prospective spicule region.

11. The abnormal shadow detecting method as defined in claim 1, wherein the different kinds of detecting processes comprise a process for detecting a growth shadow region in which convergence of density gradients in an image of an object is calculated by the use of an iris filter and a prospective growth shadow region is detected by extracting a region where the convergence of the density gradients is high, a process for detecting a prospective category 3 growth shadow region by extracting a region where a contrast is high and a boundary is clear, a process for detecting a prospective asymmetric shadow region in which left and right mammary gland distributions are compared with each other and a prospective asymmetric shadow region is detected by extracting regions where the left and right mammary gland distributions are not symmetric, and a process for detecting a prospective spicule region in which convergence of lines in a lineation is calculated and a prospective spicule region is detected by extracting a region where a convergence of the lines is high.

12. The abnormal shadow detecting method as defined in claim 8, wherein the at least two detecting processes comprise an iris filter process and any one of a contrast detecting process, an asymmetry detecting process, and a spicule detecting process.

* * * * *